April 28, 1970  A. DESRAYAUD ET AL  3,508,512
AUTOMATIC SYSTEM FOR DYNAMICALLY ANCHORING A
FLOATING INSTALLATION Filed March 21, 1968  2 Sheets-Sheet 1

INVENTORS
ANDRE DESRAYAUD
PIERRE AUBEL

BY *Craig e Antonelli*

ATTORNEYS

INVENTORS
ANDRE DESRAYAUD
PIERRE AUBEL

BY *Craig & Antonelli*

ATTORNEYS

United States Patent Office 3,508,512
Patented Apr. 28, 1970

3,508,512
AUTOMATIC SYSTEM FOR DYNAMICALLY ANCHORING A FLOATING INSTALLATION
Andre Desrayaud, Louveciennes, and Pierre Aubel, Rueil-Malmaison, France, assignors to Institut Francais du Petrole des Carburants et Lubrifiants, Rueil-Malmaison, France
Filed Mar. 21, 1968, Ser. No. 714,923
Claims priority, application France, Mar. 29, 1967, 100,740
Int. Cl. B63h 25/00; G05b 11/14
U.S. Cl. 114—144                                    6 Claims

ABSTRACT OF THE DISCLOSURE

An automatic device for dynamically anchoring an aquatic mobile installation wherein there are means provided for generating control signals of thrusts exerted by the propulsive means which are actuated when the absolute value of a signal of position variation exceeds a predetermined limit value by furnishing a control signal of a variation of the component of the thrusts along the direction of the deviation. This control signal has a value independent of the variation signal. The component of the thrusts is thereafter stabilized to a value corresponding to a reduction of the variation in position until the chosen limit value is reached, which may be very small, from the variation in position.

---

Figures 1A, 1B:
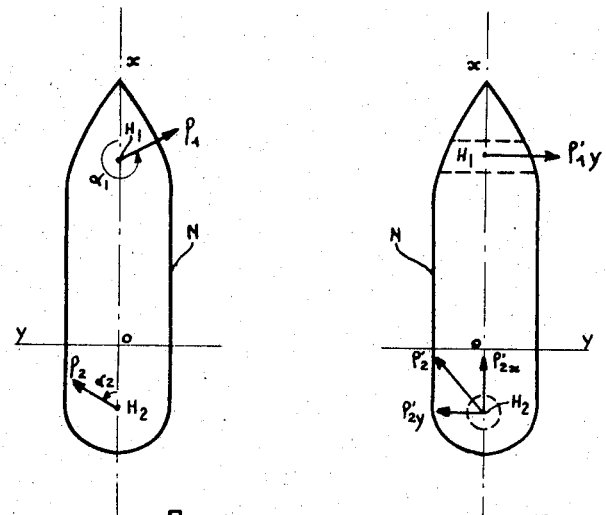

The present invention relates to a new automatic system for dynamically anchoring or positioning an aquatic mobile installation, such as a ship or a drilling platform.

Automatic systems for dynamically positioning a floating installation have been already proposed, these systems using at least two propulsion units capable of exerting on the installation thrusts of adjustable magnitude and/or direction which are opposed to the action of external forces due to winds, currents, etc. tending to move the installation away from a selected position.

These automatic dynamic positioning systems include means for measuring in the form of signals, the deviation existing between the position of the installation and a reference position, an electromechanical or electrical unit also called resolver or computer, adapted to elaborate from said deviation signals, control signals corresponding to the respective magnitudes and/or directions of the thrusts to be exerted by the propulsion units in order to limit the deviation of the position of the installation and means for controlling the respective magnitudes and/or directions of the thrusts of these propulsion units by the respective values of said control signals.

An important problem arising during the construction of such systems is to provide for a precise positioning of the floating installation, irrespective of the variations in the external forces which tend to displace this installation and not only to counterbalance the action of these forces by the action of these propulsion units, whereby the distance between the position of equilibrium and the reference position depends on the magnitude of the forces involved.

In particular, if the values of the control signals elaborated by the resolver of the system vary as the detected deviations in the position, being for example substantially proportional to these deviations, the automatic dynamic positioning system will only permit to stop, to limit a displacement of the floating installation occurring under the action of an external perturbation, and will not move the installation back to its initial position as long as the perturbation remains, since such a system provides control signals and hence an adjustment in the thrusts of the propulsion units sufficient to counterbalance or equilibrate the action of the perturbation only for a determined deviation in the position of the installation, this deviation being necessarily different from zero and corresponding consequently to a position of equilibrium different from the reference position.

The present invention gives a solution to this problem by providing an automatic dynamic positioning system capable of maintaining a floating installation substantially in a reference position, irrespective of the action of the external elements which tend to displace the installation from this reference position.

The automatic dynamic positioning system according to the invention includes at least two propulsion units having adjustable thrusts, measuring means adapted to provide signals representing the deviation between the position of the installation and its reference position, control means for regulating the thrusts exerted by the propulsion units and means for generating control signals supplied to said control means.

This system is characterized in that said means for generating control signals are adapted to be actuated every time the absolute value or magnitude of a deviation signal becomes greater than a selected limiting value corresponding to a drift of the installation with respect to its reference position, providing then a control signal which generates a variation in the component of the thrusts along the direction of drift, the value of this control signal being independent of said deviation signal and the polarity of this control signal corresponding to that of the deviation signal, said means for generating control signals being moreover adapted to stabilize said thrust component by suppressing said thrust variation controlling signals for a decreasing absolute value of said deviation signal.

The system according to the invention is furthermore adapted to cancel said control signal for a value equal to zero of the deviation signal.

In a first embodiment of the invention the means generating control signals for the thrusts are adapted to initiate a progressive variation in these thrusts according to a predetermined law of variation as a function of time in the direction tending to move the installation back to its reference position when the absolute value or magnitude of a deviation signal becomes greater than a limiting value, said means for generating control signal being adapted to interrupt said variation in the thrusts only when the magnitude of said deviation signal has become again smaller than that of the selected limiting value.

In a second embodiment of the invention, the control means are adapted to interrupt said variation of the thrust in the direction tending to move the installation back to its reference position only after the speed of the drift of the installation has been reduced to zero.

Figure 2:
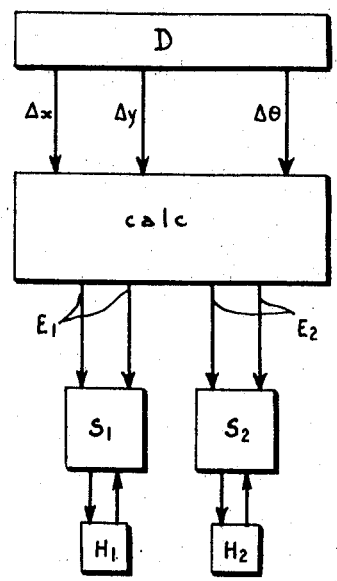
Figure 4:
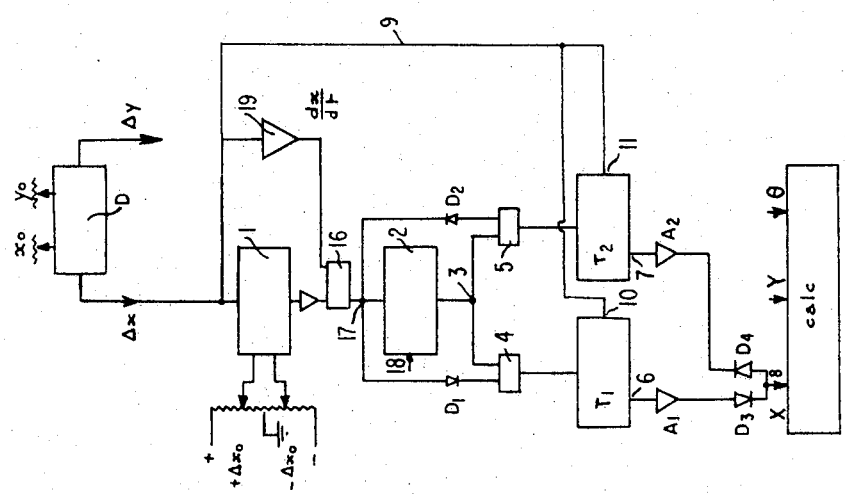
Figure 3:
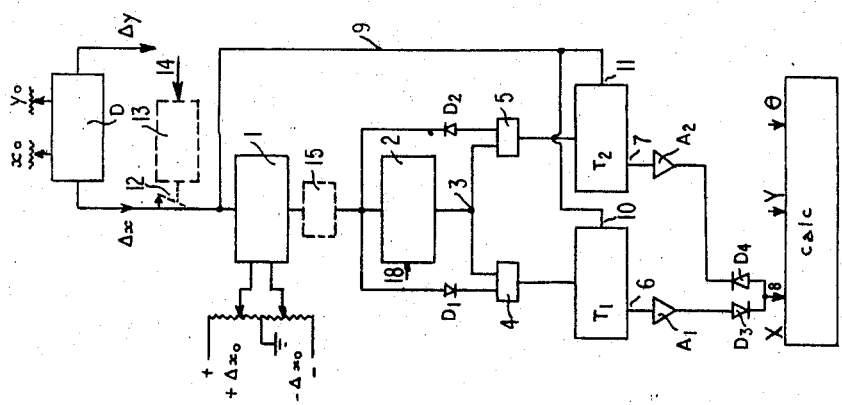

Some non-limitative embodiments of the present invention are described hereinunder, with reference to the attached drawings, wherein;

FIGURES 1A and 1B diagrammatically illustrate two embodiments of an equipment for dynamically positioning a floating installation, FIGURE 2 is a very simplified diagram illustrating an automatic dynamic positioning system, FIGURE 3 illustrates a first embodiment of an automatic dynamic positioning system according to the invention, FIGURE 4 corresponds to a second embodiment of the invention.

In the embodiment shown by FIGURE 1A of an equipment of a floating installation or ship N, adapted for the dynamic positioning thereof, are used two propulsion units the thrusts direction of which are adjustable in a horizontal plane by pivoting the propulsion unit about a vertical axis, these propulsion units $H_1$ and $H_2$ being for example of the outboard type.

The dynamic positioning is then achieved by regulating, the respective magnitudes $\rho_1$ and $\rho_2$ of the thrusts and their directions, $\alpha_1$, $\alpha_2$ in a horizontal plane, so as to counteract the action of the external forces which tend to move the installation N away from the selected position.

The directions of the thrusts will for example be detected by their angle of inclination with respect to the longitudinal axis $Ox$ of the installation (O being the centre of gravity of N and $Ox$, $Oy$ being a system of rectangular axes connected with the installation).

The dynamic positioning equipment illustrated by FIG. 1B includes a transverse screw propeller $H_1$ of the variable pitch type having a substantially constant speed of rotation, located in a tunnel traversing from side to side the bow of the vessel and a propulsion unit having vertical pivotable blades, or cycloidal propeller, located at the stern of this ship.

The dynamic positioning of N is performed by controlling through the pitch of the screw propeller $H_1$ the magnitude and the direction of the thrust exerted by this propeller and by regulating the components $\rho'_{2x}$, $\rho'_{2y}$ along $Ox$ and $Oy$ respectively of the thrust exerted by the propulsion unit $H_2$.

In another embodiment described in patent application No. 605,263 the propulsion units are fixed to a central annular part of the floating installation, which is freely rotatable around a vertical axis, with respect to this installation.

Irrespective of the embodiment which is selected for the dynamic positioning system and which may moreover be substantially different from the above-indicated exemplative embodiments, the functional diagram of an automatic dynamic positioning system may be illustrated in its most simplified form by the diagram of FIGURE 2.

This system includes one or many measuring instruments generally indicated by the reference D on FIG. 2, which supply signals representing the deviation of the position of N from a reference position.

This deviation may be represented by a signal which is a function of the distance separating the centre of gravity O of the installation from its reference position.

The distance may moreover be substituted for by its components along the two axes $Ox$ and $Oy$, represented by the corresponding deviation signals $\Delta x$ and $\Delta y$.

The deviation of the heading of the installation with respect to a reference heading may optionally be measured and represented by a deviation signal $\Delta \theta$.

An electromechanical or electrical computer unit, indicated by the reference (calc.), will combine the different deviation signals and deliver at its two outputs, $E_1$ and $E_2$, which respectively corresponds to the propulsion units $H_1$ and $H_2$, control signals supplied to servo-regulators $S_1$ and $S_2$ for controlling the respective thrusts of the propulsion units $H_1$ and $H_2$ in the direction tending to counteract the drift of N with respect to its reference position.

These control signals will in the embodiment of FIG. 1A be signals controlling the respective magnitudes ($\rho_1$, $\rho_2$) and directions ($\alpha_1$, $\alpha_2$) of the thrusts exerted by the propulsion units $H_1$ and $H_2$ and in the embodiment of FIG. 1B a signal controlling the pitch of the screw propeller $H_1$ and two signals controlling the respective components along $Ox$ and $Oy$ of the thrust to be exerted by $H_2$.

In the embodiment according to the above-mentioned patent application, the control signals are only related to the respective magnitudes of the thrusts to be exerted by the two propulsion units.

If the position deviation signals, such as $\Delta x$, $\Delta y$ and $\Delta \theta$ vary as the deviations which they measure, being for example proportional to these deviations, it appears that the control signals themselves will vary in the same way, and there will be therefore an adjustment of the thrusts exerted by the propulsion units $H_1$ and $H_2$ only in proportion to the deviation between the position taken by the installation and its reference position.

Under these conditions the ship N will move under the action of an external pertubation of substantially constant intensity until its deviation from the reference position is sufficient so that the return action generated by the propulsion units for the considered deviation exactly counterbalances or equilibrates the action of this perturbation and the ship will remain in this equilibrium position, different from its initial positon, as long as the perturbaton will exist.

The invention obviates this drawback with an automatic dynamic positioning system adapted to supply a control signal to the propulsion units, as soon as the absolute value of a deviation signal exceeds an adjustable predetermined limiting value, which corresponds to a drift of the installation from its reference position, said control signal being adapted to cause a return-action of the propulsion units, the intensity of this action increasing with the time, independently of the value of the deviation signal, at least as long as the drift of the installation has not been stopped.

In the first embodiment of the invention shown on FIGURE 3 by way of example, a measuring instrument, which may be of any suitable known type, such as for example a tiltmeter or inclinometer having a taut line connecting a fixed location of the water floor with the floating installation N, supplies electric signals $\Delta x$ and $\Delta y$, which are respectively functions of the component along the axis $Ox$ of N and of the component along the axis $Oy$, of the deviation of the position of N from a selected reference position, the coordinates $x_0$ and $y_0$ of which in the same coordinate system are fixed and are adjustable by potentiometric means.

In the following only the signal $\Delta x$, will be considered, it being understood that the deviation signal $\Delta y$ and, as the case may be, also the deviation signal $\Delta \theta$ representing the deviation of the installation heading with respect to a reference heading, can be applied to circuits similar to those actuated by $\Delta x$ and diagrammatically shown by FIGURES 3 and 4.

The signal $\Delta x$ is applied to comparator means 1 which may be constituted of an electronic comparator unit of any known type adapted to deliver an electric actuating signal exclusively when the absolute value of the deviation signal $\Delta x$ becomes greater than that of a reference signal $\Delta x_0$ representing the maximal deviation allowed along the axis $Ox$ ($\Delta x_0$ may be adjusted to the selected value through potentiometer means and may optionally be equal to zero). The signal delivered by the comparator 1 will have in this embodiment a fixed value and a positive or negative sign depending on the sign of $x$.

This signal will trigger a pulse generator 2 of a known type producing at its output terminals periodical pulses at regular time intervals, and the operation of which is stopped when no signal is supplied by the comparator 1.

The system includes two logical elements 4 and 5 of the type gate "AND," each having two input terminals one of which is connected with the output terminal 3 of the pulse generator 2.

The other input terminal of each of both gates 4 and 5 is connected with the output terminal of the comparator 1 through a diode, the diodes $D_1$ and $D_2$, which correspond respectively to the two gates, having opposite polarities.

Under these conditions it appears that the gate 4 will let a passage to the periodical pulses as long as the comparator 1 delivers a positive signal and exclusively in this case, and that the gate 5 will let a passage to these pulses exclusively when the comparator 1 delivers a positive signal.

The pulses appearing at the output terminals of the gates 4 and 5 are respectively applied to the impulse counters $T_1$ and $T_2$ associated with digital-to-analog converters which may be of any suitable known type adapted to generate at their respective output terminals 6 and 7 signals proportional to the number of received pulses. These output terminals are interconnected at 8 through the amplifiers $A_1$ and $A_2$ and the diodes $D_3$ and $D_4$ of opposed polarities, respectively.

At the terminal 8 will appear a drift deducing signal X having the same polarity as the deviation signal $\Delta x$, but the value is independent of the latter, its value increasing with the time according to a predetermined law (proportionally to the time in the indicated exemplative embodiment), as soon as the absolute value of $\Delta x$ becomes greater than $\Delta x_0$.

Drift reducing signals Y and optionally $\theta$ are generated in analogous manner as the signal X, from the above-defined signals $\Delta y$ and optionally $\Delta \theta$ representing a deviation in the position of the installation.

According to the invention, the signals X, Y and optionally $\theta$ are applied, instead of the signals $\Delta x$, $\Delta y$ and $\Delta \theta$ respectively, to the means generating such control signals for the propulsion units as the signals $\rho_1$, $\rho_2$, $\alpha_1$, $\alpha_2$ which have been hereinabove defined by reference to FIGURE 1A, or $\rho'_{1y}$, $\rho'_{2x}$, $\rho'_{2y}$ defined by reference to FIGURE 1B.

Under these conditions a system according to the invention, such as the one illustrated by FIGURE 3 will be adapted to increase the resulting thrust of the propulsion unit in the direction tending to move the installation back to its reference position defined by $x_0$, $y_0$ and optionally $\theta_0$, as soon as the absolute value of $\Delta x = x - x_0$ (and/or $\Delta y$, and/or $\Delta \theta$) becomes greater than that of the limiting drift $\Delta x_0$ or $\Delta y_0$ and/or $\Delta \theta_0$, respectively which is admitted, this increase in the thrust being continued in the same direction as long as the comparator 1 delivers a signal, i.e. as long as the absolute value of the deviation signal remains greater than the fixed limiting value (which is adjustable and may be chosen as small as desired and even equal to zero).

When the comparator 1 does not deliver any output signal, which corresponds to the return of the floating installation to its reference position, the functioning of the pulse generator 2 is stopped and consequently the value of the drift reducing signal X does not vary any longer, which results in a stabilization of the thrusts exerted by the propulsion units (more exactly these thrusts do not vary any more if Y and optionally $\theta$ also remains stationary).

The impulse counters $T_1$ and $T_2$ are reset to zero when the deviation signal $\Delta x$ becomes equal to zero, by means of the conductor 9 connecting the output of the measuring device D with the input terminals for resetting to zero the impulse counters $T_1$ and $T_2$.

Under these conditions, when the floating installation is back in its reference position corresponding to $x = x_0$, $y = y_0$ and eventually $\theta = \theta_0$ the signals X, Y and eventually $\theta$ become equal to zero, which result in the cancellation of the resulting thrust and of the resulting rotational force exerted by the propulsion units on the floating installation.

It will obviously be also possible to provide for the resetting to zero of the counters $T_1$ and $T_2$ for values of $\Delta x$, $\Delta y$ and $\Delta \theta$ which are different from zero and are for example close to $\Delta x_0$, $\Delta y_0$ and $\Delta \theta_0$ respectively, in order to prevent that the return-thrust exerted on the floating installation make it pass the reference position thereof.

This resetting to zero may be controlled by opening a switch (not illustrated) located on the conductor 9.

It will optionally be possible to provide between the measuring means, such as D, and the comparator, such as the comparator 1, means for intermittent electric connection indicated in dotted line on FIG. 3 and constituted of a switch 12 the successive closure and opening of which are periodically controlled by a clockwork or by any suitable electronic means indicated at 13, advantageously including means for regulating the frequency of closure (indicated by the arrow 14).

Such an arrangement will provide a stepwise variation of the thrust magnitudes until the absolute values of the deviation signals $\Delta x$, $\Delta y$ ($\Delta \theta$) become smaller than the absolute values $|\Delta x_0|$, $|\Delta y_0|$, $|\Delta \theta_0|$ respectively.

In such an embodiment the signals emanating from the comparator means 1 will have the shape of rectangular signals, the length of which is a function of the duration of the period of closure of the switch and it will generally be necessary to place at the output terminals of the comparator 1 a conventional device 15 for shaping these rectangular signals, permitting to give then a well-defined adjustable length, such a device being for example constituted of a monostable electronic flip-flop.

In the embodiment according to FIGURE 3, it will be advantageous to provide means for regulating the speed of variation of the signal X as a function of time, for example by adjusting (arrow 18) the frequency of the pulses produced by the generator 2 and/or by adjusting the gains of the amplifiers $A_1$ and $A_2$.

This adjustment may be performed either manually by an operator or automatically as a function of the speed $dx/dt$ of the variation of the deviation signal $\Delta x$ as a function of time.

The embodiment illustrated by FIGURE 4 of the means for generating control signals differs from the preceding one in that it includes means for differentiating the deviation signal $\Delta x$, which may be constituted of differentiating amplifier 19 of a conventional type and in that it includes a logical element 16, or gate "AND," of a known type, to which is simultaneously applied after amplification the signal delivered by the comparator 1 and the one provided by the derivating-amplifier 19.

This gate 16 is adapted to deliver an output signal when the signal emanating from the comparator 1 and the signal $dx/dt$ have the same sign, i.e. when the absolute value of $\Delta x$ is greater than that of $\Delta x_0$ and when simultaneously the respective components along Ox of the deviation signal of the floating installation and of its speed of displacement have the same sign, which corresponds to a drift of this installation with respect to its reference position.

The signal supplied by the gate 16 at the output terminal thereof 17 is simultaneously applied to the two diodes $D_1$ and $D_2$ and to the pulse generator which this signal controls, in accordance with the diagram of FIG. 3, the remainder of the system between the elements $L_1$, $D_1$, $D_2$ and the computer (calc.) being identical to the one which has been previously described with respect to this figure.

With the embodiment of FIG. 4, as long as the floating installation will move in the direction increasing its deviation with respect to the reference position of this installation, the signal X (or/and Y, or/and $\theta$) will vary and it will result therefor a correlative variation of the control voltages ($\rho_1$, $\alpha_1$, $\rho_2$, $\alpha_2$ or $\rho'_{1y}$, $\rho'_{2x}$, $\rho'_{2y}$ etc. . . . ) generated by the computer providing a progressive variation of the thrusts (in magnitude and/or direction) in the direction which tends to counteract the movement of the installation (for example a progressive increase of the component along the axis Ox of one of the thrusts).

When the displacement has been stopped, the signal X will remain invariable since the signals generated by the counters $T_1$ and $T_2$, which are proportional to the number of pulses generated by the generator 2 between the instant when $\Delta x = \Delta x_0$ and the instant when the sign of $dx/dt$ is changed, are maintained as long as these recorders are not reset to zero (which occurs for $\Delta x = \Delta x_0$) through the conductor 9.

Consequently, the component along Ox of the resulting thrust will remain constant after the instant the sign $dx/dt$ is changed, i.e. the direction of displacement of the installation has been reversed.

Under these conditions, since the inertia of the floating installation moreover prevents the direction of displacement of the propulsion units to be reversed before the resulting thrust of the propulsion units has become substantially greater than the perturbation which caused the drift of the installation, the installation can be moved back to its reference position even if the intensity of the perturbation which has moved it remains constant because X will keep the value it has reached at the instant $dx/dt$ has become equal to zero, as long as the deviation $\Delta x$ has not been cancelled.

Means may be provided for introducing a time-lag or delay with respect to the instant when $dx/dt=0$, in the interruption of the variation of X i.e. in the variation of the component along $Ox$ of the resulting thrust exerted by the propulsion units, tending to move the installation back to its reference position, so as to thereby accelerate this return movement.

Another means to achieve this result consists in controlling by the differentiating amplifier 19 the application to the impulse counters $T_1$, $T_2$ or to the terminal 8 of the computer (calc.) one or many pulses having the same polarity as X, by means of any suitable device, at the instant when the sign of $dx/dt$ is changed, in order to increase the absolute value of the signal applied to the terminal 8, and thus the component along $Ox$ of the resulting return thrust, which will be then stabilized at the value corresponding to the total number of pulses received by the counter $T_1$ or $T_2$.

The resetting to zero of the impulse counters $T_1$ and $T_2$ may also be effected before the cancellation of the deviation $\Delta x$, by opening a switch placed on the conductor 9, whereby this opening may be either manually or automatically controlled.

In this last case this switch may for instance be opened by a signal for resetting to zero the counters, as soon as the absolute value of the speed $dx/dt$ of return to the reference position becomes greater than a fixed value indicated on a speed comparator, the signal $dx/dt$ being applied to this speed comparator only when its sign is opposite the sign of $\Delta x$, i.e. in the blocked position of the gate 16, so as to really corresponding to a displacement of the installation toward its reference position.

Various modifications can be made in the above-described embodiments, without departing from the scope of the present invention.

For example, in an embodiment adapted to the dynamic positioning equipment according to the above-mentioned prior patent application 605,263 it will be sufficient to substitute, in the diagrams of FIG. 3 or FIG. 4 of the present specification, for the measuring device D producing the deviation signals $\Delta x$ and $\Delta y$, a measuring device delivering a signal $\rho$ which is proportional to the distance separating the centre of gravity O of the floating installation from its reference position, applying the signal generated at the terminal 8 (FIG. 3) to the two amplifiers FA1 and FA2 illustrated by FIG. 3 or said prior patent application, instead of applying to these amplifiers the signal $\rho$ itself as in the prior system.

We claim:

1. System for dynamically positioning an aquatic mobile installation, by means of at least two propulsion units adapted to exert on said installation an adjustable resulting thrust and an adjustable rotational force, said system including means for measuring the deviation between the position of the installation and a reference position thereof, in the form of deviation signals, means producing drift reducing signals from said deviation signals, means generating control signals for the propulsion units from said drift reducing signals, means for regulating the respective thrusts exerted by said propulsion units as a function of said control signals, wherein means for comparing each deviation signal with a predetermined limiting value thereof are connected between said measuring means and said means for producing drift correction signals, said comparing means being adapted to generate an actuating signal exclusively when the absolute value of said deviation signal becomes greater than said limiting value, and said means for producing drift reducing signal being adapted, upon reception of said actuating signal, to produce at least a drift reducing signal, whose intensity follows, as a function of time, a predetermined law of variation independent from the value of said deviation, in the direction which tends to reduce said deviation, and wherein said measuring means are also connected with said means for producing drift reducing signals through means for interrupting said variation of said drift reducing signal for a first reduced value of said deviation signal and through means for cancelling said drift reducing signal for a second value of said deviation signal, having an absolute value at most equal to that of said first value.

2. System in accordance with claim 1, wherein said means for interrupting the variation of said drift reducing signals are constituted by said comparing means.

3. System in accordance with claim 1, wherein said means for interrupting the variation of said drift reducing signals are associated with means for differentiating said deviation signals with respect to time and are adapted to be actuated for opposite signs of said deviation signal and the first derivative thereof.

4. System in accordance with claim 1, wherein said means for producing drift reducing signals include a generator of successive pulses, means for counting said pulses, said counting means being adapted to provide signals proportional to the number of pulses which they receive, said last-mentioned signals constituting said drift reducing signals.

5. System in accordance with claim 1, including means for intermittently applying said drift reducing signals to said means generating said control signals.

6. System in accordance with claim 4, including means for adjusting the frequency of said pulses produced by said generator.

References Cited

UNITED STATES PATENTS

| | | | |
|---|---|---|---|
| 3,145,683 | 8/1964 | Kolb et al. | 114—144 |
| 3,169,501 | 2/1965 | Wesner | 114—126 |
| 3,280,311 | 10/1966 | Shato et al. | 235—150.27 |

ANDREW H. FARRELL, Primary Examiner

U.S. Cl. X.R.

318—489